United States Patent [19]
Kuster

[11] 3,736,491
[45] May 29, 1973

[54] DC-TO-DC REGULATED CONVERTER CURRENT FOLDBACK POWER

[75] Inventor: Karl H. Kuster, Glendale Heights, Ill.

[73] Assignee: GTE Automatic Electric Laboratories Incorporated, Northlake, Ill.

[22] Filed: Apr. 7, 1972

[21] Appl. No.: 242,172

[52] U.S. Cl. ..........................321/14, 321/2, 331/62
[51] Int. Cl. ..........................H02m 1/18, H02n 7/14
[58] Field of Search ..................321/2, 14; 331/62, 331/112

[56] References Cited
UNITED STATES PATENTS

| | | |
|---|---|---|
| 3,515,974 | 6/1970 | Stich .........................................321/2 |
| 3,355,653 | 11/1967 | Paradissis ..................................321/2 |
| 3,335,361 | 8/1967 | Natale et al. ..............................321/14 |
| 3,371,262 | 2/1968 | Bird et al. ..............................321/14 X |
| 3,527,997 | 9/1970 | Nercessian ..............................321/14 X |

Primary Examiner—William H. Beha, Jr.
Attorney—K. Mullerheim, B. E. Franz, R. F. Van Epps et al.

[57] ABSTRACT

An improved current foldback power supply wherein a foldback regulating transistor circuit is coupled across the power supply to limit output current in an overload state without dissipating excessive power. Instantaneous large overloads have overcurrent protection provided by a crowbar circuit.

4 Claims, 1 Drawing Figure

Patented May 29, 1973
3,736,491
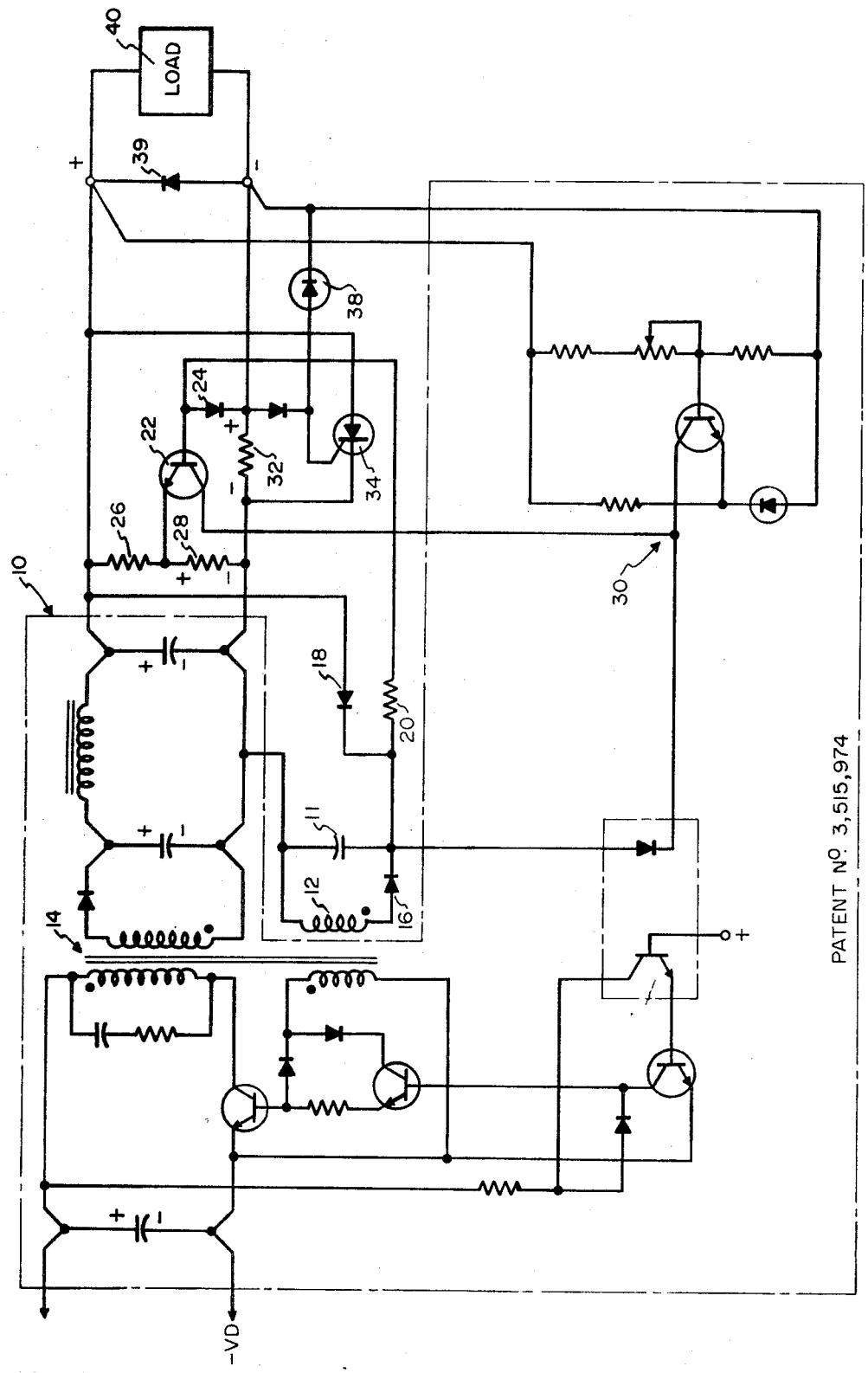
PATENT N°. 3,515,974

DC-TO-DC REGULATED CONVERTER CURRENT FOLDBACK POWER

BACKGROUND OF THE INVENTION

1. Field of the Invention

The present invention relates generally to the field of power supply circuits and more particularly to an improved current foldback power supply.

2. Description of the Prior Art

Prior to the present invention the current foldback power supply has been well known in the art. Typically, in using power supplies of this type the output current is sampled and when it reaches some preselected value a series passing or shunt element is coupled to the output to limit the current. As the output voltage of the power supply decreases due to this current limiting the output current follows the output voltage. Although this type of overload characteristic is generally desirable, a problem remains in that large amounts of power are typically dissipated in the series passing or shunt element.

Of particular utility in telephone systems is a DC-to-DC Power Supply With Isolated Control Circuit described in U.S. Pat. No. 3,515,974 which issued to Frederick A. Stich on June 2, 1970 and which is assigned to the assignee of the present application. In the application of that power supply to telephone systems a crowbar circuit is used to shunt instantaneously applied overloads until a foldback regulating circuit has the overload under control. Where, however, the load impedance is gradually reduced to a short the instantaneous current is typically inadequate to initiate the crowbar action. This situation is particularly common in electromechanical switching systems wherein a power supply may be short circuited on the order of three times per minute.

OBJECTS AND SUMMARY OF THE INVENTION

From the preceding description it will be understood that among the various objectives of the present invention are included the following:

the provision of a new and improved current foldback power supply;

the provision of apparatus of the above described character which minimizes power dissipation during overload conditions;

the provision of apparatus of the above described character which is responsive to gradually applied repetitive short circuits; and the provision of apparatus of the above described character which is responsive to instantaneous repetitive short circuits.

These and other objectives of the present invention are efficiently achieved by providing a dc-to-dc power supply with a current foldback circuit which operates to limit the power supply output current level and thus collapse the output voltage. A small output current operates to control the power supply when a gradually applied short is ultimately present. When a short circuit is instantaneously switched across the power supply output a crowbar circuit operates to provide overcurrent protection for the load.

The foregoing as well as other objects, features and advantages of the present invention will become more apparent from the following detailed description taken in conjunction with the appended drawing.

BRIEF DESCRIPTION OF THE DRAWING

The single appended FIGURE is a schematic illustration of a dc-to-dc regulated converter current foldback power supply constructed in accordance with the principles of the present invention.

DESCRIPTION OF PREFERRED EMBODIMENT

Turning now to the FIGURE there is shown a schematic diagram of a dc-to-dc power supply improved by the provision of a current foldback circuit. The basic dc-to-dc power supply 10 is shown enclosed by the dashed line and essentially comprises an input oscillator and output rectifier coupled together by a transformer. The oscillator output is controlled by an output voltage control circuit. Since both the structure and operation of the power supply 10 are fully described in above referenced U.S. Pat. No. 3,515,974, for the purposes of brevity and clarity it will be described herein only to the extent necessary to the explanation of the present invention. The present invention concerns the current foldback circuit which cooperates with the basic dc-to-dc power supply.

The basic dc-to-dc power supply 10 is improved by the addition of a second secondary winding 12 to transformer 14 of supply 10. This winding provides an output voltage during both normal and overload operation of the supply and provides the means whereby current foldback is made possible. The dot side of secondary winding 12 is coupled with capacitor 11 via rectifier diode 16 in parallel through diode 18 to the positive output of the power supply 10 and through resistor 20 in parallel to the base of npn transistor 22 and through stabilizing diode 24 to the negative output of power supply 10. A voltage divider comprising resistors 26 and 28 is coupled across the power supply output and the emitter of transistor 22 is coupled therebetween. The collector of transistor 22 is coupled to the output voltage control circuit, shown generally at 30, of power supply 10. A resistor 32 is inserted in the negative output of the power supply and provides a voltage drop across which silicon controlled rectifier 34 is coupled. The positive side of resistor 32 is coupled via diode 36 to the SCR 34 and through diode 38 in parallel to the positive output of power supply 10 and to the control circuit 30. Diode 39 is coupled across the power supply output in conventional manner. In the practice of this invention it is preferred that transistor 22 and diode 24 be selected such that the base to emitter voltage temperature coefficient of transistor 22 is substantially equal to that of the anode to cathode voltage of diode 24. In this manner the overload characteristics of the current foldback circuit may be maintained substantially temperature insensitive.

As stated hereinabove, when the load 40 coupled to power supply 10 is an electromechanical telephone switching system two overload conditions are of concern. The first is when an overload is applied slowly such as by a wiper contact which gradually reduces the load impedance to substantially zero. The second occurs when a substantially instantaneous short circuit is switched across the power supply output.

In the former situation, as the overload is slowly applied, the output current increases to a value where the voltage drop across resistor 32 exceeds that across resistor 28. When this level is reached transistor 22 will begin to conduct thereby beginning to limit the power supply output. As transistor 22 begins to conduct the power supply cannot support the output voltage at the limited output current level and the output voltage begins to collapse. As the output voltage collapses the voltage drop across resistor 28 decreases and the conduction by transistor 22 increases, further limiting the power supply output. Thus, as the output voltage collapses, less and less output current is required to maintain the voltage drop across resistor 32 above that across resistor 28. When a dead short is finally reached across the power supply output, only a very small output current is sufficient to control the power supply 10. It should be noted that when the overload is gradually applied, the voltage drop across resistor 32 typically will not reach a level sufficient to fire the silicon controlled rectifier 34.

The regulator diode 38 and silicon controlled rectifier 34 comprise a conventional overvoltage crowbar circuit while diode 36 and silicon controlled rectifier 34 comprise the overcurrent crowbar circuit. When a short circuit is switched, i.e., applied substantially instantaneously across the output of power supply 10, the voltage drop across resistor 32 is equal to the product of the output current times the resistance 32. If this instantaneous product is equal to or larger than some preselected value, silicon controlled rectifier 34 will fire, shunting the overload until transistor 22 effects control of the overload. Silicon controlled rectifier 34 will only conduct during a transition from a normal load to an overload, thus effectively limiting spikes in the output current. It will continue to conduct until the output voltage has collapsed to a preselected level such that transistor 22 provides analog control of the overload. Typically the silicon controlled rectifier will conduct for less than 8 microseconds.

By way of illustrative example the Applicant has found that the following component values may be used to advantage in a current foldback circuit for use with a 12 volt, 1.65 ampere dc-to-dc power supply:

| | |
|---|---|
| capacitor 11 | 2.2 microfarads |
| resistor 20 | 90.0 kilohms |
| resistor 26 | 750 ohms |
| resistor 28 | 20 ohms |
| resistor 32 | 0.2 ohms |

These values are, of course, only representative of a single embodiment of the present invention and are not to be construed as limiting the applicability of the invention to power supplies having different characteristics.

From the preceding description it will be seen that the Applicant has provided a new and improved power supply of the current foldback type wherein the objectives set forth hereinabove are efficiently achieved. Since certain changes in the above-described construction will occur to those skilled in the art without departing from the scope of the invention it is intended that all matter set forth in the description or shown in the appended drawing shall be interpreted as illustrative and not in a limiting sense.

Having described what is new and novel and desired to secure by Letters Patent, what is claimed is:

1. An improved dc-to-dc converter of the type including an input oscillator, an output rectifier, a transformer coupling said input oscillator and said output rectifier, and a control means coupled between said rectifier output and said oscillator for sampling the rectifier output voltage, comparing said output voltage to a preselected standard voltage, and generating a signal to control the output of said oscillator, and wherein said improvement comprises an oscillator output sampling means including an auxiliary secondary winding incorporated in said coupling transformer, one side of said secondary winding coupled to the positive polarity output of said rectifier, a current foldback means including a voltage divider coupled to the other side of said secondary winding, and across the output of said rectifier, an npn transistor having an emitter coupled to said voltage divider, a base coupled in parallel to said secondary winding and to the negative polarity output of said rectifier, and a collector coupled to said control means, a resistance element coupled in said negative polarity output of said rectifier between said voltage divider and said transistor base, and a first diode having an anode coupled to said transistor base and a cathode coupled to said negative polarity output of said rectifier, and the voltage drop across said resistance element exceeding that between said transistor emitter and said negative polarity output of said rectifier when said converter is overloaded such that said transistor is biased into conduction to thereby limit the output of said converter.

2. Apparatus as recited in claim 1 further including an overcurrent crowbar circuit comprising a silicon controlled rectifier having a cathode coupled to one side of said resistance element in parallel with said voltage divider, an anode coupled to said positive polarity output of said rectifier, and a control electrode, and a second diode having a cathode coupled to the control electrode of said silicon controlled rectifier and an anode coupled to the other end of said resistance element in parallel with said transistor base.

3. Apparatus as recited in claim 2 further including a third diode having an anode coupled to the control electrode of said silicon controlled rectifier, a cathode coupled to the positive polarity output of said rectifier in parallel with said control means, and cooperating with said silicon controlled rectifier to provide an overvoltage crowbar circuit.

4. Apparatus as recited in claim 1 wherein the base to emitter voltage temperature coefficient of said transistor is substantially equal to the anode to cathode voltage temperature coefficient of said first diode.

* * * * *